C. BODMER.
SPIRIT LEVEL.
APPLICATION FILED NOV. 11, 1909.
959,296.
Patented May 24, 1910.
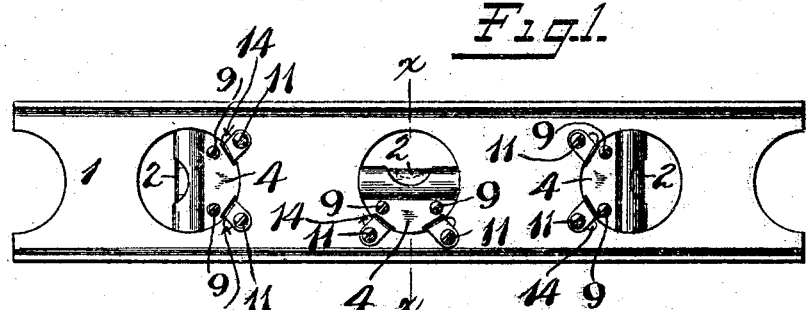
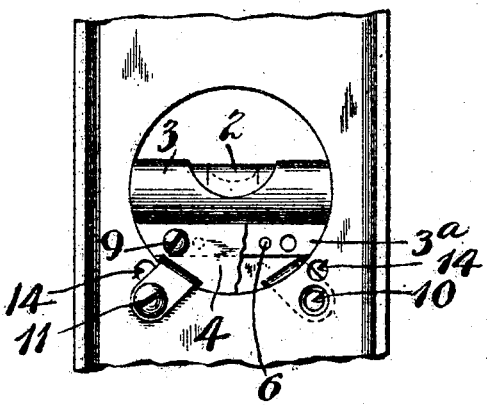
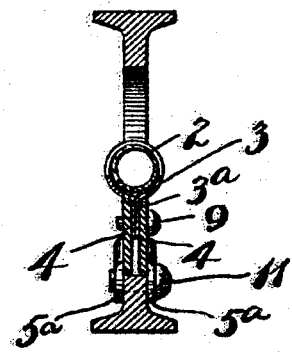
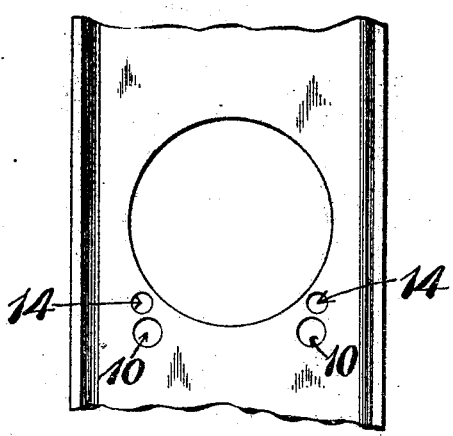
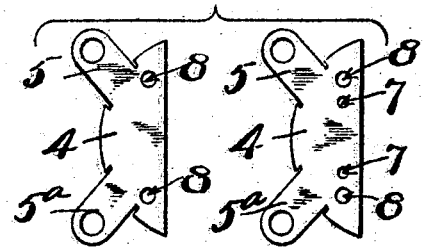
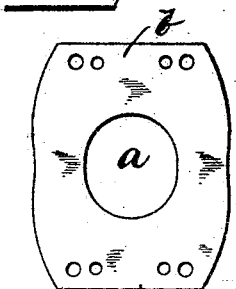
Witnesses:
Fred H. M. Dannenfelser.
Chas. A. Piard
Inventor
C. BODMER.
By Attorney
Bailey Bonner Nicolson

UNITED STATES PATENT OFFICE.

CHRISTIAN BODMER, OF NEW BRITAIN, CONNECTICUT, ASSIGNOR TO THE STANLEY RULE & LEVEL COMPANY, OF NEW BRITAIN, CONNECTICUT, A CORPORATION OF CONNECTICUT.

SPIRIT-LEVEL.

959,296.      Specification of Letters Patent.      Patented May 24, 1910.

Application filed November 11, 1909. Serial No. 527,379.

*To all whom it may concern:*

Be it known that I, CHRISTIAN BODMER, a citizen of the United States, residing at New Britain, county of Hartford, State of Connecticut, have invented certain new and useful Improvements in Spirit-Levels, of which the following is a full, clear, and exact description.

My invention relates to spirit-levels and plumbs, the object being to improve the construction both of the level glass holding device and of the means for connecting the same to the beam or stock of the level.

The invention has particular utility when employed in a level having a metal stock as will hereinafter be seen.

Various other advantages will be apparent to the mechanic skilled in the art from a reading of the following description and an examination of the accompanying drawings, in which—

Figure 1 is a side elevation (on a reduced scale) of a combined plumb and level; Fig. 2 is a relatively enlarged view of a portion of the device shown in Fig. 1, said view illustrating the plumb glass shown at one end of the apparatus in the preceding figure, said view being partly broken away; Fig. 3 is a section on the line $x$—$x$ Fig. 1, relatively enlarged; Fig. 4 is a view similar to Fig. 2, the level glass and carrying frame being removed; Fig. 5 is a view of companion details detached; Fig. 6 is a view of a blank employed in making one of the parts of the level glass carrying device.

1 represents a stock of an I-beam cross section. In the web of this beam and passing transversely therethrough are one or more openings for receiving the level glass and level glass carrier. In the particular form shown in Fig. 1 three of these openings are provided, the center one being employed for a level glass, the end ones being employed for oppositely arranged plumb glasses. The arrangement of the parts is such that no part of the level glass or level glass carrier or adjusting mechanism stands above the flanges of the I-beam with the result that all such parts are protected from injury when the beam 1 is laid upon its side. Since the bubble glass whether used for a level or plumb, together with its carrier, corresponds in each of the three instances shown in Fig. 1, it will be necessary to describe only one form of carrier. To that end, particular reference is now directed to Figs. 2 to 6.

2 is a "bubble glass" so-called.

3 is a tubular case, cut away at one side to provide a sight opening at the middle upper part thereof. The case 3 is preferably formed from such a blank as shown in Fig. 6, said blank having a central opening $a$, the two end edges $b$—$b$ furnishing (when the case or carrier is completed) a rib or fin $3^a$ whereby said case may be connected to coupling plates, by which the leveling appliance proper is adjustably connected to the beam 1 of the level.

4—4 are the coupling plates preferably provided as a pair, one on each side of the rib or fin $3^a$. Each coupling plate is provided with ear portions. In the form shown two ears 5—$5^a$ are preferably provided at the edge of each plate. The general outline of each coupling plate, aside from the projecting ears 5—$5^a$, corresponds to the segment of a circle. The ears $5^a$ not only project away from the coupling plate 4 but are also laterally offset so that the curved edge of the coupling plate may take a bearing close to or against the wall of the opening in the beam 1 in which it stands. One of the coupling plates is preferably rigidly connected with the ribbed portion $3^a$ of the case 3, this connection being afforded by rivets 6 which pass through holes 7—7 in one of the coupling plates. Other holes 8—8 are provided in each plate 4 to receive clamping screws 9—9. One of said sets of holes 8 or 9 is tapped out to receive the threaded portion of the screws 9, whereby the parts may be clamped together, as shown in Fig. 3. The ears 5—$5^a$ of the plates 4—4 straddle and embrace a portion of the web of the beam 1.

10—10 are clearance holes or openings in the web of the beam, the same being considerably larger than the shank portion of the clamping screws 11—11, so that when the parts are assembled, as shown in the drawings, the opposite ears may be first adjusted and then clamped down tightly upon the web of the beam 1, holding the level glass in its adjusted position. One or more openings 14—14 may be provided closely adjacent to the ears 5—$5^a$, whereby a small tool may be inserted to change the angular position of the level glass carrier relatively to the beam 1 for the purpose of adjustment and whereby the most delicate adjustment can be attained. When adjustment is to be made the clamping screws 11 are sufficiently released to permit said level glass carrier to be pried or shifted around into the desired position and then tightened up.

What I claim is:

1. In an instrument of the character described, a bubble glass, a carrier therefor comprising a socket portion having a sight opening, a rib or fin projecting laterally from said socket portion, a coupling rigidly secured to said fin, a beam, a pair of ears laterally offset and extending from one edge of said coupling, said ears being arranged to lie adjacent to said beam, and means for adjustably securing said ears to said beam, the edges of said beam having laterally projected flanged portions arranged to protect the aforesaid mechanism.

2. In an instrument of the character described, a beam, a bubble glass, a carrier therefor comprising a socket having a sight opening, a rib or fin depending from said socket and extending longitudinally thereof, a pair of coupling plates arranged to be secured on opposite sides of said fin, an opening in said fin arranged to receive said parts, ears on said coupling plates arranged to stand on opposite sides of said beam, a clamping screw connecting said coupling plates, said beam having a clearance opening for said clamping screw of a size to permit said screw to be moved laterally therein.

3. In an instrument of the character described, a stock of I-beam cross section, and including a web having an opening therein, a leveling device arranged in said opening and extending across the same, said leveling device comprising a bubble glass, a socket having a sight opening, a rib or fin projecting therefrom and extending longitudinally thereof, a pair of coupling plates, one of the same being rigidly secured to one side of said fin, the other being detachably secured to the opposite side of said fin, and means to adjustably secure said coupling plates to the web of said stock, said means straddling said web.

4. In an instrument of the character described, a beam, a bubble glass, a carrier therefor comprising a socket having a sight opening, a rib or fin having an opening therein and depending from said socket and extending longitudinally thereof, a pair of coupling plates arranged to be secured on opposite sides of said fin, in said opening, ears on said coupling plate arranged to stand on opposite sides of said beam, a clamping screw connecting said coupling plates, said beam having a clearance opening for said clamping screw of a size to permit said screw to be moved laterally therein, a bearing shoulder on said web adjacent to a portion of the bubble glass carrier, whereby said carrier may be adjusted by a suitable tool arranged between said shoulder and carrier.

5. In a spirit-level, the combination of a stock or beam having circular openings therein, a bubble glass holder having an integral projecting rib in the outer surface of the same, a coupling plate having a circular outer edge conforming to the said circular opening in the level stock, the said plate having a plurality of similar projecting ears at the outer curved edges thereof, and a fastening means to adjustably clamp the said ears to said stock.

6. In a spirit-level, a stock having circular openings therein, an adjustably mounted tube holder, a plate having a circular outer edge secured thereto, fastening ears projecting from the outer edge of the said plate, and means to securely connect the said tube holder and plate in one of the level stock openings, the body of the said stock having openings therein which form shoulders to receive a tool in the act of adjusting the tube holder.

CHRISTIAN BODMER.

Witnesses:
WILLIAM J. WORAM,
I. W. CHAPMAN.